United States Patent
Lark, Jr. et al.

(10) Patent No.: US 9,839,099 B2
(45) Date of Patent: Dec. 5, 2017

(54) INTELLIGENT LIGHTING CONTROL APPARATUSES, SYSTEMS, AND METHODS

(71) Applicant: Locoroll, Inc., Cupertino, CA (US)

(72) Inventors: William Lark, Jr., Glendale, CA (US); Ann Claire Lim Chi Cheung, San Francisco, CA (US)

(73) Assignee: Noon Home, Inc., Cupertino, CA (US)

( * ) Notice: Subject to any disclaimer, the term of this patent is extended or adjusted under 35 U.S.C. 154(b) by 0 days.

(21) Appl. No.: 15/452,483

(22) Filed: Mar. 7, 2017

(65) Prior Publication Data

US 2017/0257930 A1 Sep. 7, 2017

Related U.S. Application Data

(60) Provisional application No. 62/304,616, filed on Mar. 7, 2016.

(51) Int. Cl.
H05B 37/02 (2006.01)
H01H 3/02 (2006.01)
H01H 3/22 (2006.01)

(52) U.S. Cl.
CPC ........... H05B 37/0245 (2013.01); H01H 3/02 (2013.01); H01H 3/22 (2013.01); *H01H 2215/00* (2013.01)

(58) Field of Classification Search
CPC ......... H05B 37/0245; H01H 3/02; H01H 3/22
USPC ........................................................ 315/132
See application file for complete search history.

(56) References Cited

U.S. PATENT DOCUMENTS 9,386,668 B2 * 7/2016 Knapp ............. H04L 12/40045
9,389,769 B1 * 7/2016 O'Keeffe ............. G06F 1/3262
2007/0291010 A1 * 12/2007 Altonen ............... H05B 39/085
  345/173
2009/0128312 A1 5/2009 Sawada et al.
2009/0189542 A1 * 7/2009 Wu ...................... H01H 9/0271
  315/294
2011/0175838 A1 7/2011 Higa
2012/0195045 A1 * 8/2012 King ................. H05B 37/0227
  362/253
2012/0286940 A1 * 11/2012 Carmen, Jr. ........ F21V 33/0052
  340/12.5
2012/0318657 A1 * 12/2012 Hoffknecht .......... H03K 17/962
  200/600
2013/0111342 A1 5/2013 Alameh et al.
(Continued)

FOREIGN PATENT DOCUMENTS

DE 102011054357 B4 * 6/2014 ......... H05B 37/0272
GB EP 3062586 A1 * 8/2016 ........... H01H 9/0271

OTHER PUBLICATIONS

International Search Report and Written Opinion for App. Ser. No. PCT/US17/21176, dated Jul. 5, 2017, 12 pages.

*Primary Examiner* — Dylan White
(74) *Attorney, Agent, or Firm* — Fish & Richardson P.C.

(57) ABSTRACT

The present disclosure provides light switch modules and methods of implementing a light switch module for a lighting control system. The light switch modules include a light switch actuator including an actuation surface. The light switch actuator is movable to connect an electrical flow path and to activate a tactile display housed in the light switch actuator. One or more tactile motions are applied on the actuation surface of the light switch actuator for selecting a lighting setting from among a plurality of lighting settings using the tactile display.

19 Claims, 11 Drawing Sheets

(56) References Cited

U.S. PATENT DOCUMENTS

2013/0257315 A1\* 10/2013 Restrepo ............ H05B 37/0209
　　　　　　　　　　　　　　　　　　　　　315/362
2015/0357133 A1\* 12/2015 Keirstead ............... H01H 23/04
　　　　　　　　　　　　　　　　　　　　　200/339

\* cited by examiner

INTELLIGENT LIGHTING CONTROL APPARATUSES, SYSTEMS, AND METHODS

RELATED APPLICATION

The present application claims priority to U.S. Provisional Patent Application No. 62/304,616, filed on Mar. 7, 2016, entitled "INTELLIGENT LIGHTING CONTROL APPARATUSES, SYSTEMS, AND METHODS," which application is incorporated herein by reference in its entirety.

TECHNICAL FIELD

The present application relates generally to the field of lighting control systems.

BACKGROUND

Customizing and automating home lighting control devices is often epitomized by the installation of unsightly lighting switches that are inundated with light switches confusingly mapped to respective fixtures. Automated home lighting control systems can also include large, complex, expensive central hubs that can require expert or skilled technicians for installation and/or operation. Smart light bulbs and/or Wi-Fi enabled lightbulbs introduced into any of these contexts or even in simpler ones can disadvantageously be limited by the light switch that it is associated with and/or the lighting fixture itself. For example, if a light switch associated with a smart light bulb is switched off the smart light bulb becomes inoperable.

SUMMARY

The inventors have appreciated that various embodiments disclosed herein provide apparatuses, systems, and methods for lighting control.

Various embodiments provide light switch modules.

In particular embodiments, a light switch module includes a light switch actuator including an electrical contact component. The light switch actuator is configured to move the electrical contact component from a first position to a second position to connect an electrical flow path by movement of an actuation surface of the light switch actuator. The light switch module also includes a tactile display that is coupled to or housed at least in part in the light switch actuator. The light switch actuator is configured for activation by movement of the actuation surface moving the electrical contact component to the second position. The tactile display is configured to move contemporaneously with the actuation surface. The tactile display is configured to cause selection of a lighting setting selected from a plurality of lighting settings in response to one or more tactile motions on the actuation surface. The tactile display is configured to discretely display a distinct icon in response to a change in the selection of the lighting setting.

In particular embodiments, the light switch module includes a control system electrically coupled to the electrical contact component and the tactile display. The control system is configured to identify a power distribution scheme allocating a discrete quantity of electrical power to each lighting fixture in a plurality of lighting fixtures in response to selection of the lighting setting via the tactile display. The control system is configured to cause distribution of the discrete quantity of electrical power to each lighting fixture in the plurality of lighting fixtures based on the identified power distribution scheme.

In particular embodiments, the control system is further configured to change the power distribution scheme in response to the change in the lighting setting via the tactile display.

particular embodiments, the control system is configured for activation by movement of the actuation surface moving the electrical contact component to the second position.

In particular embodiments, the light switch actuator includes a pivoting switch.

In particular embodiments, the light switch actuator includes a push button switch.

In particular embodiments, the light switch actuator includes a sliding switch.

In particular embodiments, the light switch actuator is spring biased.

In particular embodiments, the tactile display comprises a light emitting diode display.

In particular embodiments, the light emitting diode display is an organic light emitting diode display.

In particular embodiments, the tactile display comprises a MEMS display.

In particular embodiments, the tactile display comprises a liquid crystal display.

In particular embodiments, the one or more tactile motions on the actuation surface includes a vertical swipe.

In particular embodiments, the lighting setting and the discrete icon are configured to change in proportion to the length of the vertical swipe with respect to a length of the tactile display.

In particular embodiments, the lighting setting and discrete icon are configured to change in proportion to the duration of the vertical swipe.

In particular embodiments, the lighting setting is configured to have a gradient of light intensity in a vertical direction in the room in proportion to the vertical swipe.

In particular embodiments, the one or more tactile motions includes a horizontal swipe.

In particular embodiments, the lighting setting is configured to have a gradient of light intensity in a lateral direction in the room in proportion to the horizontal swipe.

In particular embodiments, the one or more tactile motions includes a combination of a swipe and a tap, the tap causing a selection of light intensity proportional to at least one of a length and a duration of the swipe.

In particular embodiments, the light switch module includes a base module and a wall plate configured to be positioned between the light switch actuator and the base module.

In particular embodiments, the light switch actuator includes a multi-pin connector configured to engage a multi-pin socket in the base module.

In particular embodiments, the base module is sized and shaped to correspond substantially to an interior region of a one-gang wall electrical box.

In particular embodiments, the base module is sized and shaped to correspond substantially to a space designated for one switch in a multi-gang electrical box.

In particular embodiments, the base module is sized and shaped to correspond substantially to an interior region of a single switch unit and can fit side by side with an additional base module or at least one of a $3^{rd}$-party switch or outlet unit in a multi-gang wall electrical box.

In particular embodiments, the base module includes two screw openings for mounting the base module in a wall electrical box.

Various embodiments provide methods of operating a light switch module.

In particular embodiments, a method of operating a light switch module includes activating a tactile display housed in a light switch actuator by moving an actuation surface of the light switch actuator. The movement of the actuation surface causes an electrical contact component of the light switch actuator to move from a first position to a second position to connect an electrical flow path. The tactile display is configured to move contemporaneously with the actuation surface. The method also includes, in response to receiving a lighting setting selection request via the tactile display, identifying a lighting setting from among a plurality of lighting settings, each lighting setting corresponding to a distinct power distribution scheme for at least one light fixture connected to the light switch module based on the identified lighting setting. Each distinct power distribution scheme is configured to cause an allocation of a discrete quantity of electrical power to the at least one light fixture. The method also includes transmitting one or more power signals to the at least one light fixture based on the identified lighting setting.

In particular embodiments, the plurality of light settings having distinct power distribution scheme for light fixtures connected to the light switch module.

In particular embodiments, activating the tactile display includes pivoting the actuation surface.

In particular embodiments, activating the tactile display includes pushing the actuation surface.

In particular embodiments, activating the tactile display includes sliding the actuation surface.

Various embodiments provide a computer program product for use on a control system of a light switch module.

In particular embodiments, the computer program product includes a computer useable medium having computer readable program code stored on the computer useable medium. The computer readable program code includes program code for causing a first icon to display on a tactile display in response to receipt of an activation signal received in response to movement of the tactile display by movement of an actuation surface of a light switch actuator housing the tactile display. The computer readable program code includes program code for causing transmission of a first power signal to a lighting fixture corresponding to the first icon displayed. The computer readable program code includes program code for changing the display from the first icon to a second icon in response to receipt of switching signal from the tactile display. The computer readable program code includes program code for causing transmission of a second power signal to the lighting fixture in response to receipt of the switching signal.

In particular embodiments, the computer program product includes a non-transitory computer-readable storage device storing computer executable instructions that, if executed by a computer system, cause the computer system to carry out particular operations Various embodiments provide systems for controlling a light switch control module.

In particular embodiments, a system for controlling a light switch control module includes a connection module configured to generate a communication interface between a mobile electronic device and a light switch module. The system also includes a lighting setting display module configured to cause a display of icons on a display device of the mobile electronic device. The system includes a lighting setting selection module configured to receive a lighting setting selection from a plurality of selections, the lighting setting selection corresponding to one of the icons. The system further includes a transmission module configured to transmit the lighting setting selection to the light switch module. The transmission of the lighting setting selection is configured to cause the light switch module to display the one of the icons on a tactile display of the light switch module housed in the light switch actuator and to cause the light switch module to distribute a power distribution scheme allocating a discrete quantity of electrical power to lighting fixtures based on the lighting setting selection.

Various embodiments provide systems for controlling a configuration of a light switch control module comprising.

In particular embodiments, a system for controlling a configuration of a light switch control module includes a connection module configured to generate a communication interface between a mobile electronic device and a light switch module. The system for controlling a configuration of a light switch control module includes a light fixture identification module configured to initiate a sensor based protocol configured to identify a parameter associated with one or more light fixtures connected to the light switch control module. The system for controlling a configuration of a light switch control module includes a display selection module configured to cause a display of an icon on a display device of the mobile electronic device. The system for controlling a configuration of a light switch control module includes a lighting setting configuration module configured to allow a power distribution scheme to be set for the one or more light fixtures based on the identified parameter and a user specified input related to light intensity. The system includes a storage module configured to store the power distribution scheme set and associate the icon with the power distribution scheme. The system includes a transmission module configured to transmit the power distribution scheme and the associated icon with the power distribution scheme to the light switch control module.

In particular embodiments, the identified parameter includes a quantity of light fixtures connected to the light switch control module.

In particular embodiments, the sensor based protocol is further configured to identify a power related parameter.

In particular embodiments, the light fixture identification module is configured to identify a type of light bulb connected to the light fixtures.

In particular embodiments, the sensor based protocol includes detection of light output in response to transmission of a power to the light fixtures.

In particular embodiments, the light is detected by one or more light sensors on the light switch module and the mobile electronic device.

In particular embodiments, the sensor based protocol includes detection of at least one of a voltage or a current received in response to power sent to the one or more light fixtures.

In particular embodiments, the sensor based protocol includes timing a response of the one or more light fixture to power sent to the one or more light fixtures.

In particular embodiments, the sensor based protocol includes estimating a distance of the one or more light fixture with respect to the light switch module.

Various embodiments provide methods of operating a light switch module that include moving an actuation surface of a light switch actuator to connect an electrical flow path and to activate a tactile display that is housed in the light switch actuator and that is configured to move contemporaneously with the actuation surface. The method also includes selecting a lighting setting from among a plurality of lighting settings by applying one or more tactile motions on the actuation surface of the light switch actuator.

In particular embodiments, moving includes pivoting the actuation surface of the light switch actuator.

Various embodiments provide a light switch module that includes a movable light switch and a tactile display housed in the movable light switch.

Various embodiments provide a method of installing a light switch module. The method includes electrically connecting a base component to a power supply line, coupling the base component to a wall electrical box, attaching a wall plate to the base component, and electrically connecting a light switch actuator housing a tactile display to the base component through the wall plate. The light switch actuator is connected such that the wall plate is also positioned between at least a portion of the light switch actuator and the base component. The light switch actuator includes a contact component movable by the light switch actuator from a first position to a second position to connect an electrical flow path by movement of an actuation surface of the light switch actuator. The tactile display is configured to move contemporaneously with the actuation surface of the light switch actuator. The tactile display is configured for activation by movement of actuation surface. The tactile display is configured to switch between lighting settings in response to one or more tactile motions on the actuation surface. The tactile display is configured to discretely display a distinct icon in response to a change in the lighting setting.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and exemplary embodiments of, inventive systems, methods and components of lighting control devices.

Figure 1A:
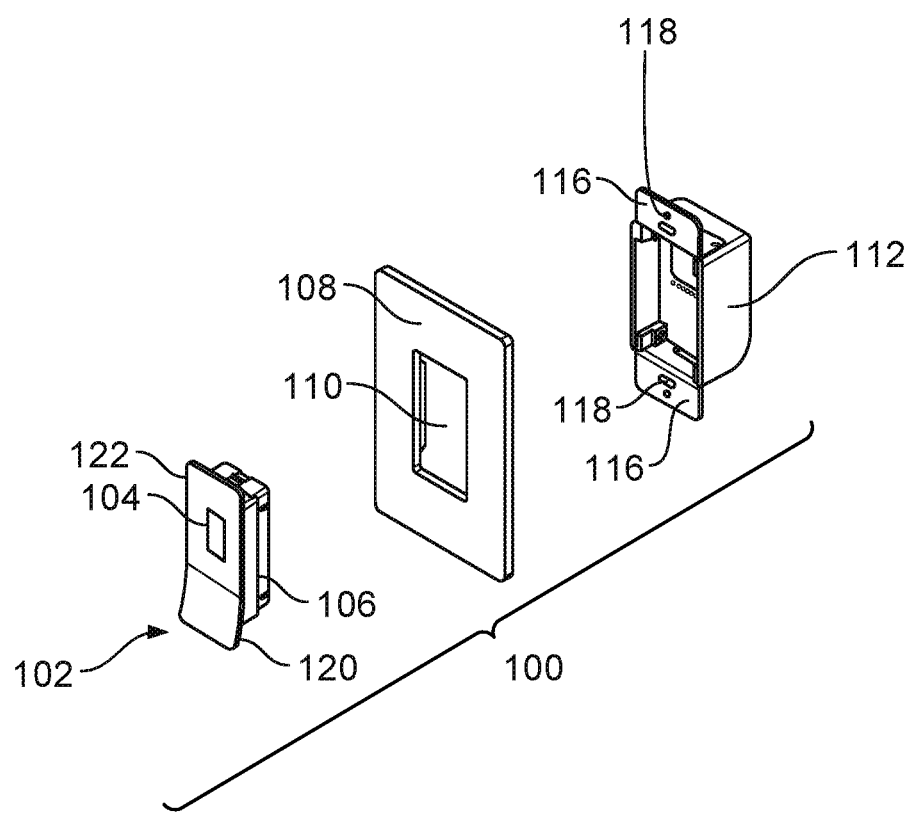
FIG. 1A is a perspective partially exploded view of a lighting control device.

FIG. 1A is a perspective partially exploded view of a lighting control device 100. The lighting control device (or lighting control system) 100 includes a switch module 102 including a light switch actuator 106 and a tactile display 104 housed in the light switch actuator 106. The lighting control device 100 also includes a wall plate cover 108 including a switch module opening 110 extending there through. The lighting control device 100 also includes a base module 112 configured for coupling to the switch module 102 via multi-pin socket 114. The base module 112 is sized and configured for receipt within a one-gang wall electrical box and has a volume corresponding substantially thereto. The base module 112 is configured to be coupled to a wall electrical box via connection tabs 116 and fastener apertures 118 in the connection tabs 116.

The light switch actuator 106 includes an outer actuation surface 122, which as discussed further herein may be composed of glass. The actuation surface 122 is movable, for example, by pushing on the curved foot 120 to cause the light switch actuator 106 to pivot, for example. The pivoting of the light switch actuator 106 and the actuation surface 122 causes a contact component (component 128 shown in FIG. 2) of the switch actuator 106 to move from a first position to a second position. Movement of the contact component causes a connection of an electrical flow path, for example by allowing two electrical contacts to connect or by connecting the contact component with an electrical contact. The connecting of the electrical flow path, permits electrical energy supplied by a power source connected to the base module 112 to energize or activate the tactile display 104, as discussed in further detail herein. The tactile display 104 is structured in the switch module to move contemporaneously with at least a portion of the actuation surface 122 and with the actuator 106. When activated or energized, the tactile display 104 allows a user to define or select predefined lighting settings where the lighting settings change the voltage or power supplied to one or more light fixtures connected to the lighting control device 100. The change in power supplied to the light fixture(s) may include a plurality of different voltages supplied to each fixture and may be based on various parameters including, but not limited to, location, light intensity, light color, type of bulb, type of light, ambient light levels, time of day, kind of activity, room temperature, noise level, energy costs, user proximity, user identity, or various other parameters which may be specified or detected. Furthermore, the lighting control device 100 may be connected to all of the light fixtures in a room or even in a house and can be configured to operate cooperatively with one or more other lighting control devices 100 located in a unit or room and connected to the same or distinct lighting fixtures.

Figure 1B:
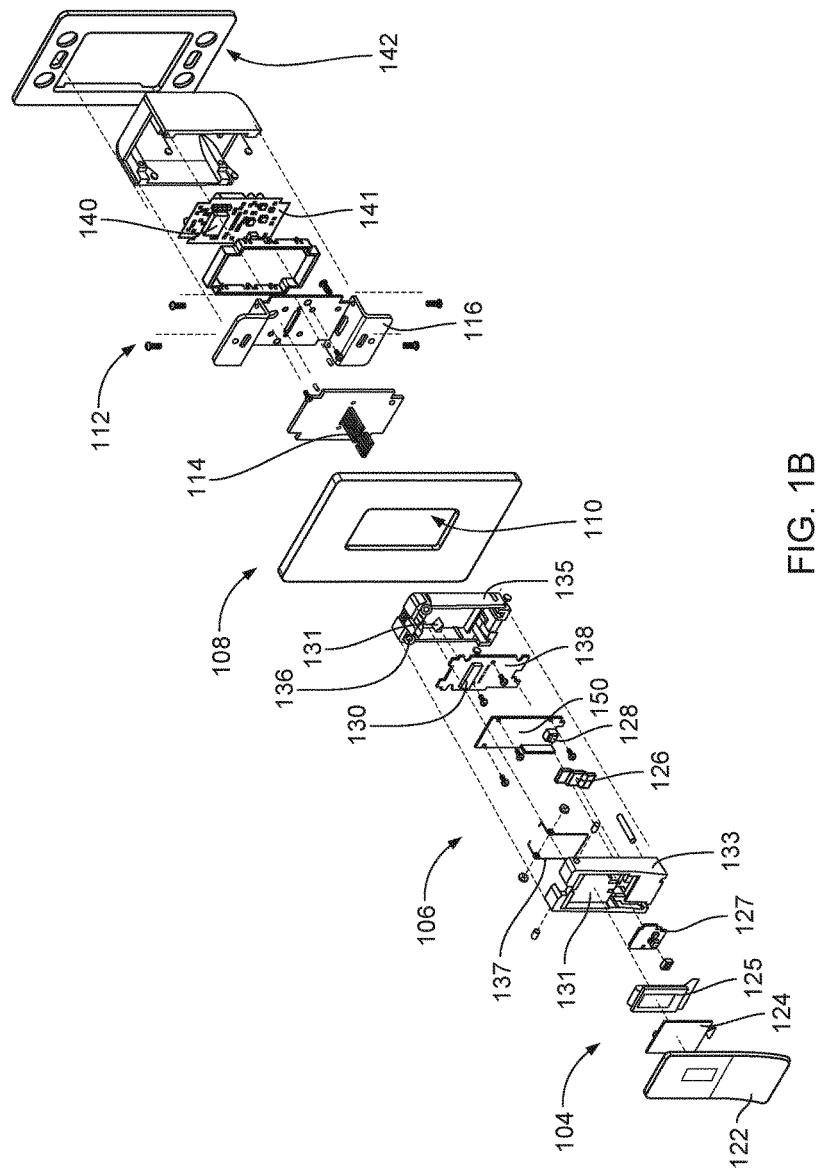
FIG. 1B is a fully exploded view of the lighting control device of FIG. 1A

FIG. 1B is a fully exploded view of the lighting control device 100 of FIG. 1A. As demonstrated in FIG. 1B, the tactile display 104 is positioned between the outer actuation surface 122 and a portion of the light switch actuator 106 (e.g., a housing portion of the light switch actuator). The actuation surface 122 may be composed of an impact-resistant glass material permitting light from the tactile display 104 and/or a clear sight of path for sensors (e.g., light sensors) 127 or other lights, such as a light from light pipe 126, which can indicate activation of the tactile display, to pass through the actuation surface 122. The tactile display 104 is composed of a polymer-based capacitive touch layer 124 and a light emitting diode panel 125, which are controlled via one or more modules or processors positioned on the printed circuit board 129. The one or more modules or processors positioned on the printed circuit board can be communicably coupled to the tactile display to cause implementation of a lighting setting stored on a memory device of the processor or coupled to the processor in response to a user selecting the lighting setting via the tactile display. The tactile display 104 is housed within a recess 131 of the light switch actuator 106 beneath the actuation surface 122. The light switch actuator 106 may comprise a thermoplastic housing including a housing cover 133 and a housing base 135. The light switch actuator housing cover 133 is pivotally connected to the housing base 135 via pins 136 and the housing cover 133 is biased with respect the housing base 135 via torsion spring 137. In particular embodiments, the light switch actuator housing cover 133 may be configured to slide or otherwise translate or rotate. The outer actuation surface 122 is biased with the switch actuator housing cover 133 and moves contemporaneously therewith in concert with the tactile display 104 housed in the cover component 133 of the light switch actuator 106. In particular embodiments, the outer actuation surface and/or the light switch actuator 106 are configured to move with respect to the tactile display 104 (e.g. to slide with respect to the tactile display). The light switch actuator 106 includes an electrical contact component structured as a switch pin 128 that is movable between positions to close an open circuit on the primary printed circuit board substrate 150, which board also houses a switch controller or processor. In certain embodiments the light switch actuator 106 can be configured to move other types of electrical contact components, for example by sliding. In certain embodiments the light switch actuator 106 may include a circuit board stack, including the primary printed circuit board substrate 150 and a secondary printed circuit board 138 The light switch actuator 106 may include a latch 136 for coupling to the base module 112 (e.g. as the light switch actuator 106 is passed through the opening 110 in the wall plate cover 108), which latch causes the light switch actuator 106 to click into place. The housing base 135 includes a multi-pin connector or plug 134 configured to engage the multi-pin socket 114 of the base module 112.

The lighting control device 100 includes a mounting chassis 142 configured to be installed to an electrical wall box. The mounting chassis 142 creates an even surface for installation of the other modules (e.g., the base module 112 and the switch module 102). Once the base module is connected to the electrical wall box via the mounting chassis 142, the wall plate cover 108 can be coupled to the mounting chassis 142 and the light switch actuator 106 can be inserted through the switch module opening 110. In particular embodiments, the wall plate cover can be coupled to the mounting chassis 142 and/or the tabs 116 of the base module via magnets. The magnets may be recessed within openings of a portion of the wall plate cover 108. As noted, the base module 112 is configured to be coupled to the mounting chassis 142 via connection tabs 116. The base module 112 is further configured to be electrically coupled to a power source (e.g., an electrical wire coming from an electrical breaker box to the electrical wall box) and to one or more light fixtures wired to the electrical box. Accordingly, the base module 112 provides an interface between a power source, the light switch actuator 106, and one or more light fixtures. The base module includes a processor 140 and a circuit board 141 for managing the power supplied by the power source and routed to the one or more light fixtures in accordance with a light setting selection identified via the light switch actuator 106 or the tactile display 104.

One or more of the processor on the printed circuit board 150 or 138 and the base module processor 140 may include wireless links for communication (directly or indirectly, e.g., via the internet) with one or more remote electronic device such as a mobile phone, a tablet, a laptop, another mobile computing device, one or more other lighting control devices 100 or other electronic devices operating in a location. In certain implementations the wireless links permit communication (directly or indirectly, e.g., via the internet) with one or more devices including, but not limited to smart light bulbs, thermostats, garage door openers, door locks, remote controls, televisions, security systems, security cameras, smoke detectors, video game consoles, robotic systems, or other communication enabled sensing and/or actuation devices or appliances. The wireless links may include BLUETOOTH classes, Wi-Fi, Bluetooth-low-energy, also known as BLE (BLE and BT classic are completely different protocols that just share the branding), 802.15.4, Worldwide Interoperability for Microwave Access (WiMAX), an infrared channel or satellite band. The wireless links may also include any cellular network standards used to communicate among mobile devices, including, but not limited to, standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

Figure 2A:
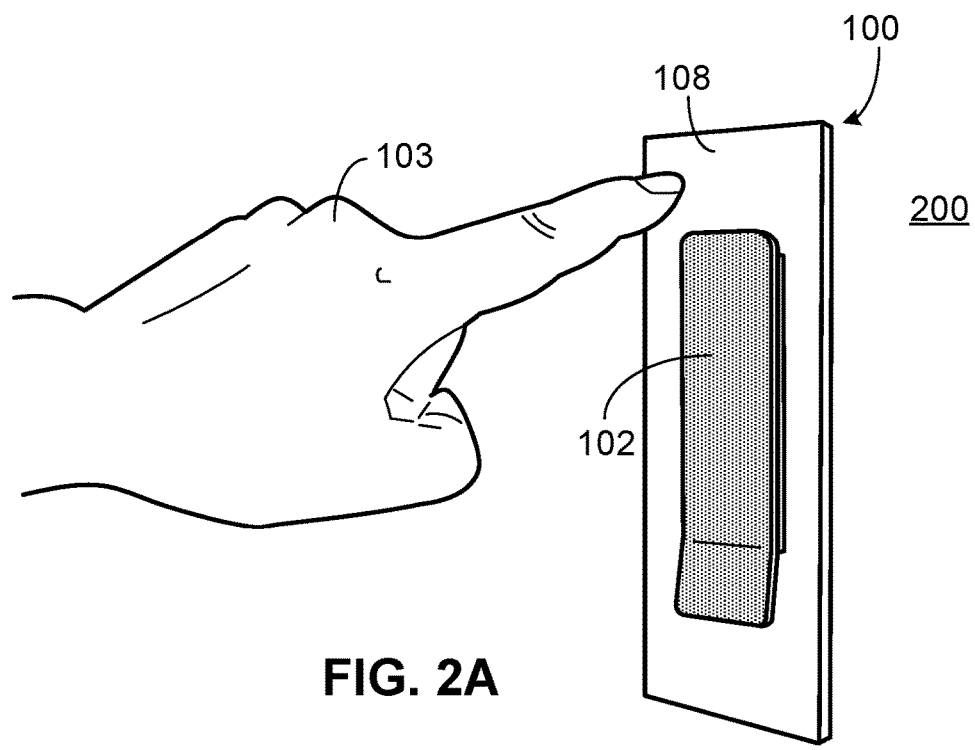
FIG. 2A shows the lighting control device of FIG. 1A mounted on a wall.

FIG. 2A shows the lighting control device 100 of FIG. 1A mounted on a wall 200. As demonstrated in FIG. 2A, the base module 112 is not visible upon installation of the lighting control device 100 in view of the wall plate cover 108. Because the wall plate cover 108 attaches to the base module 112, the wall plate cover 108 appears to be floating on the wall 200. The lighting control device 100 may be activated by a user 103 interacting with the outer actuation surface 122 and the tactile display 104.

Figure 2B:
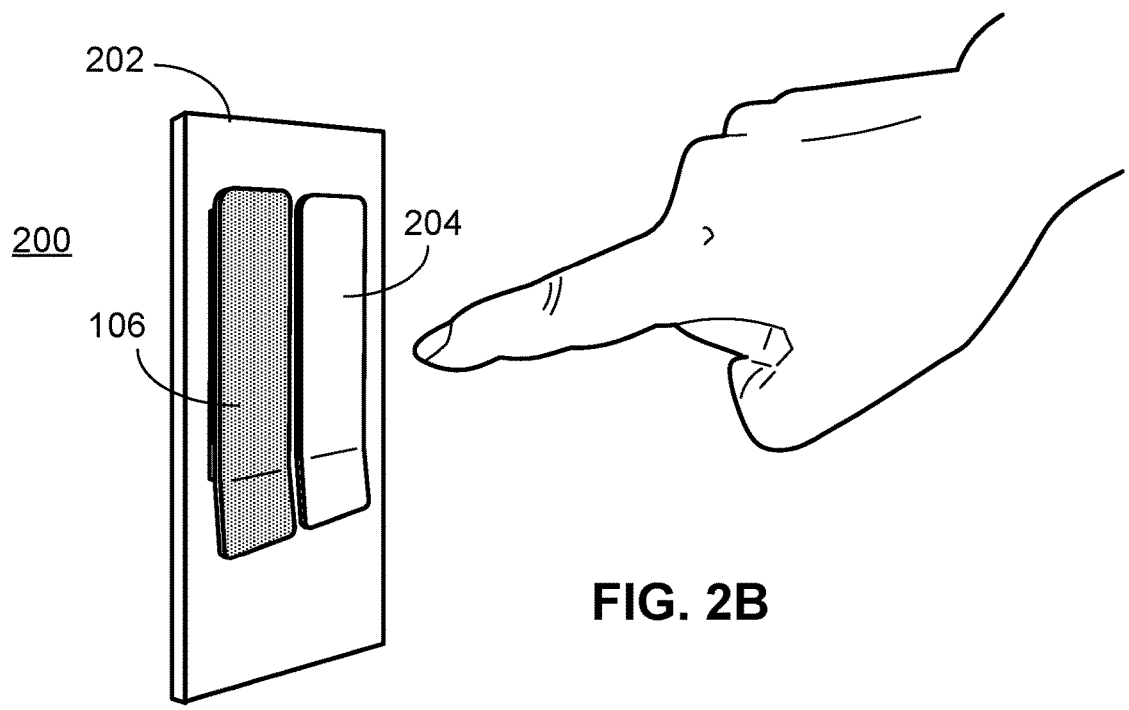
FIGS. 2B and 2C illustrate multi-switch lighting control devices.
Figure 2C:
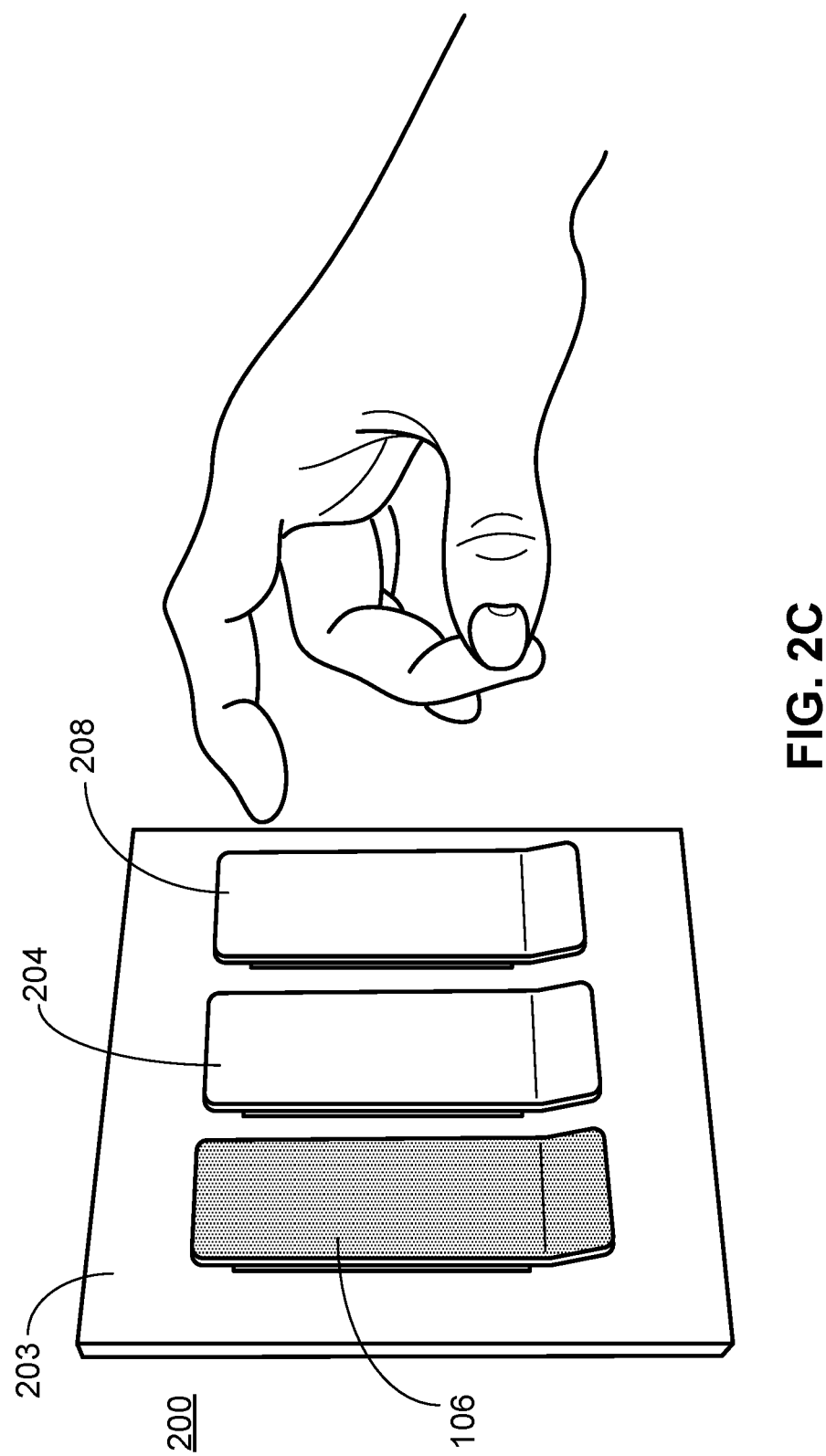

FIGS. 2B and 2C illustrate multi-switch configurations of multiple lighting control device. FIGS. 2B and 2C illustrate a two switch and three switch embodiment respectively where the lighting control devices 202 and 203 each include a light switch actuator 106 as well as auxiliary switches 204 and 208, as well as 2 and 3 base modules 112, respectively.

FIGS. 3A-3F illustrate a lighting control device transitioning through various lighting settings and a room having lighting fixtures controlled by the lighting control device.

Figure 3A:
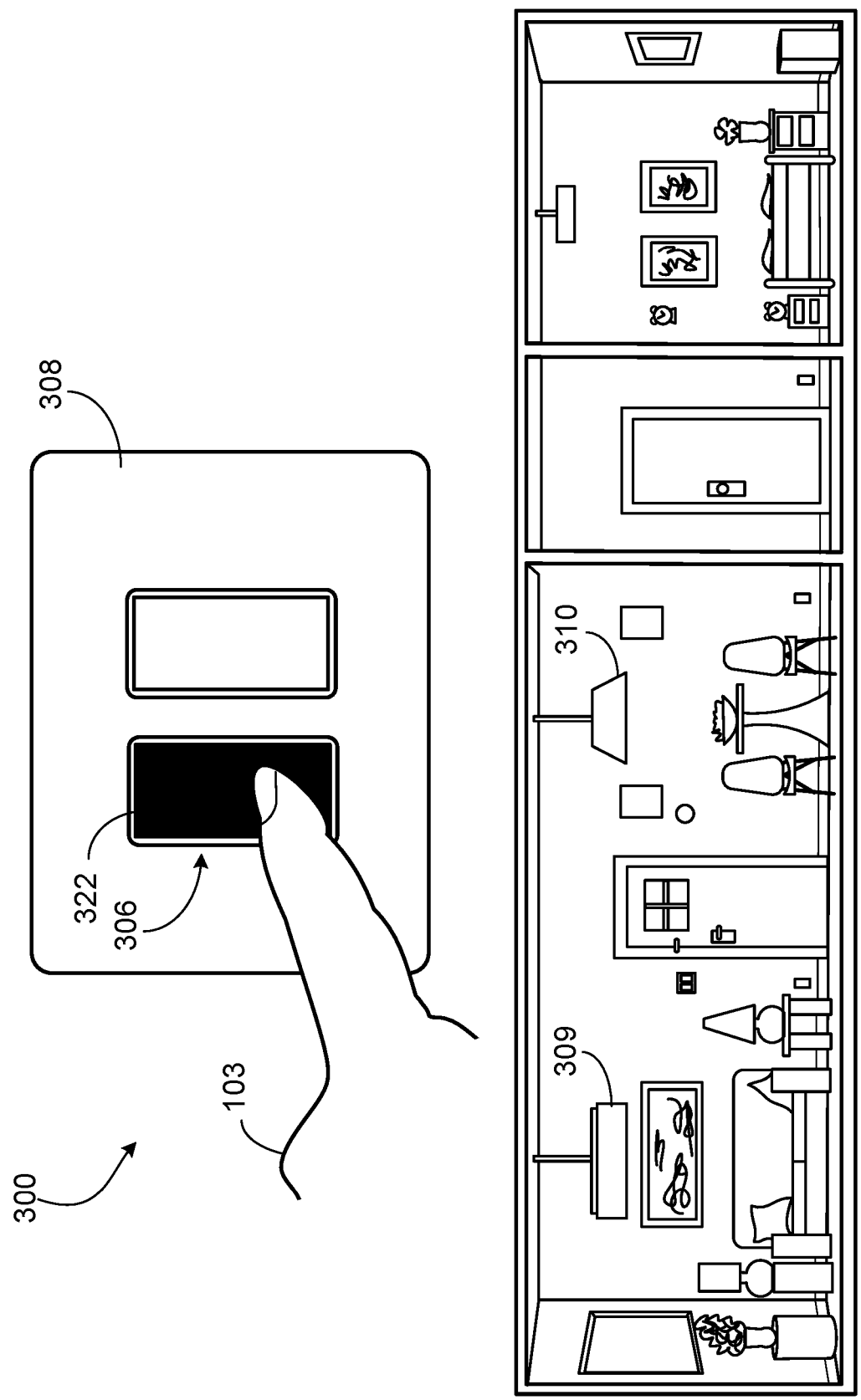
FIGS. 3A-3F illustrate a lighting control device transitioning through various lighting settings and a room having lighting fixtures controlled by the lighting control device.
Figure 3B:
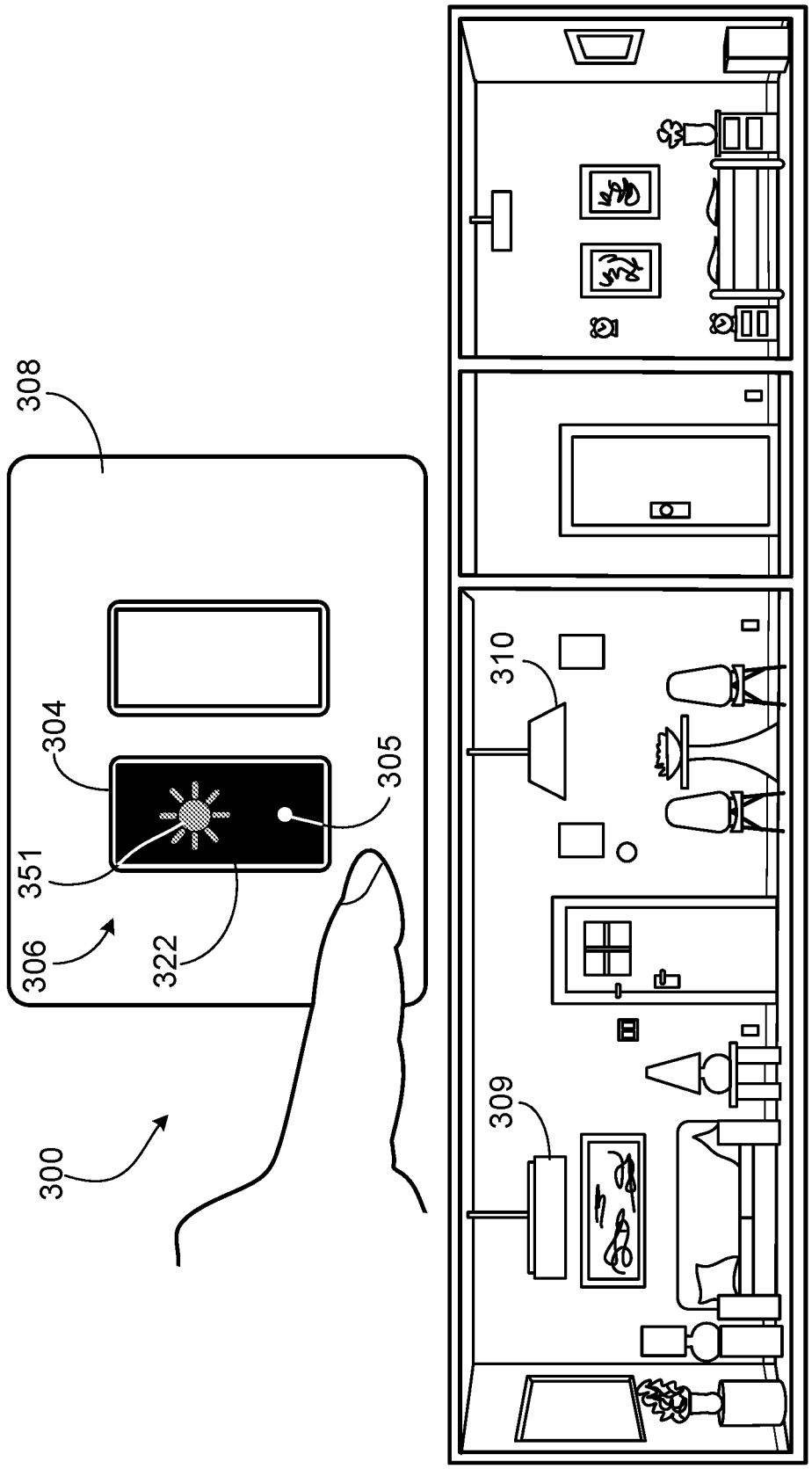
Figure 3C:
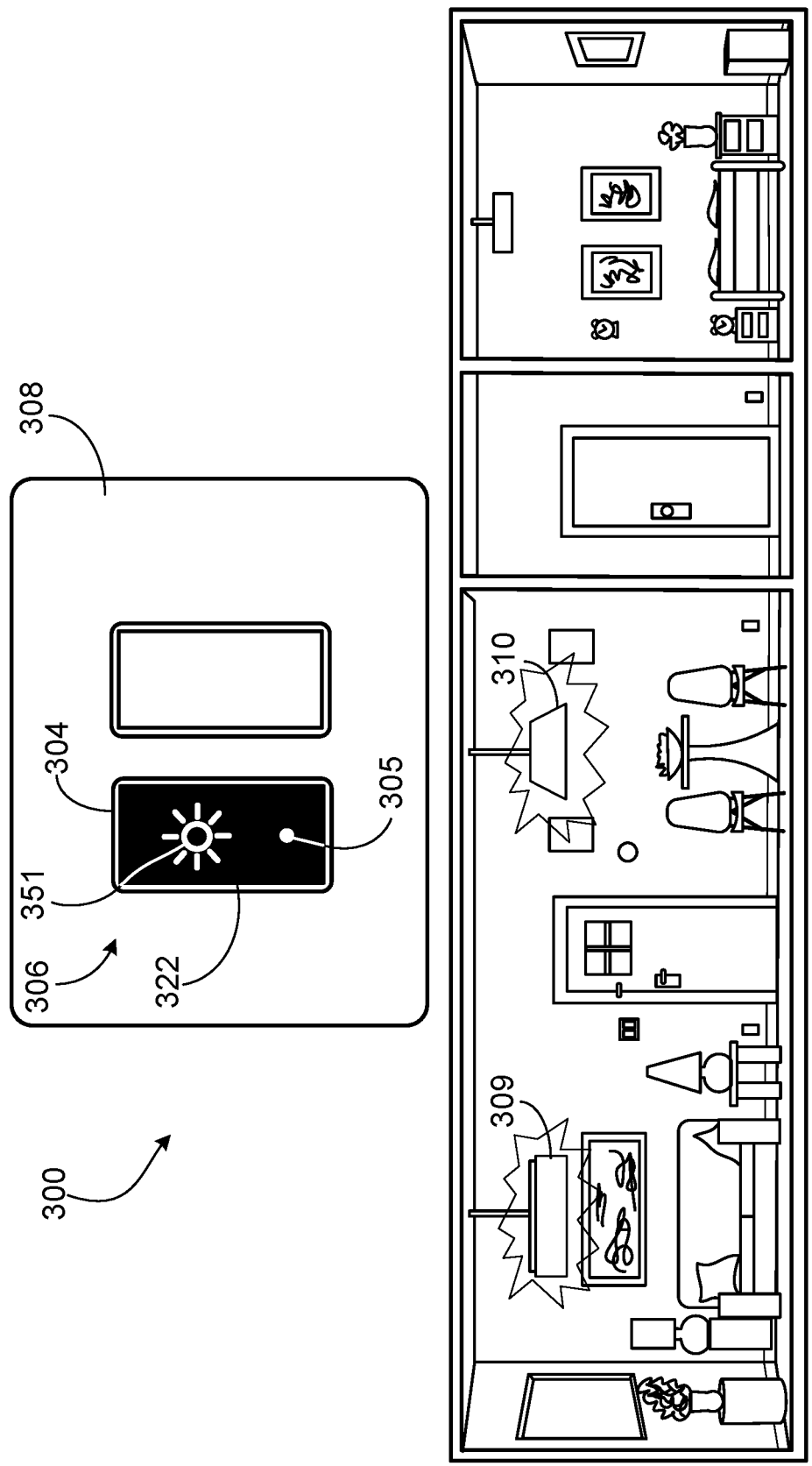
Figure 3D:
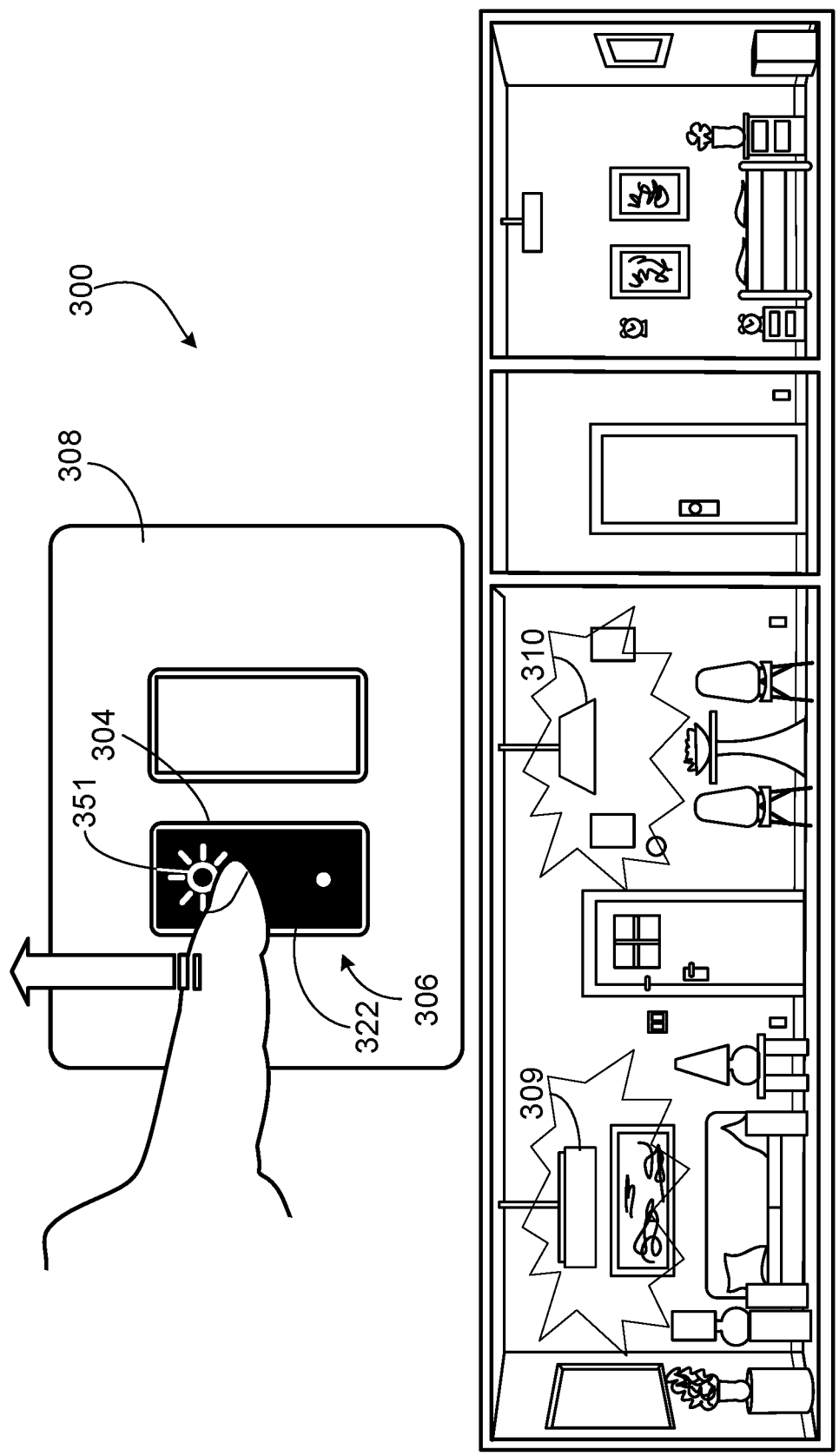
Figure 3E:
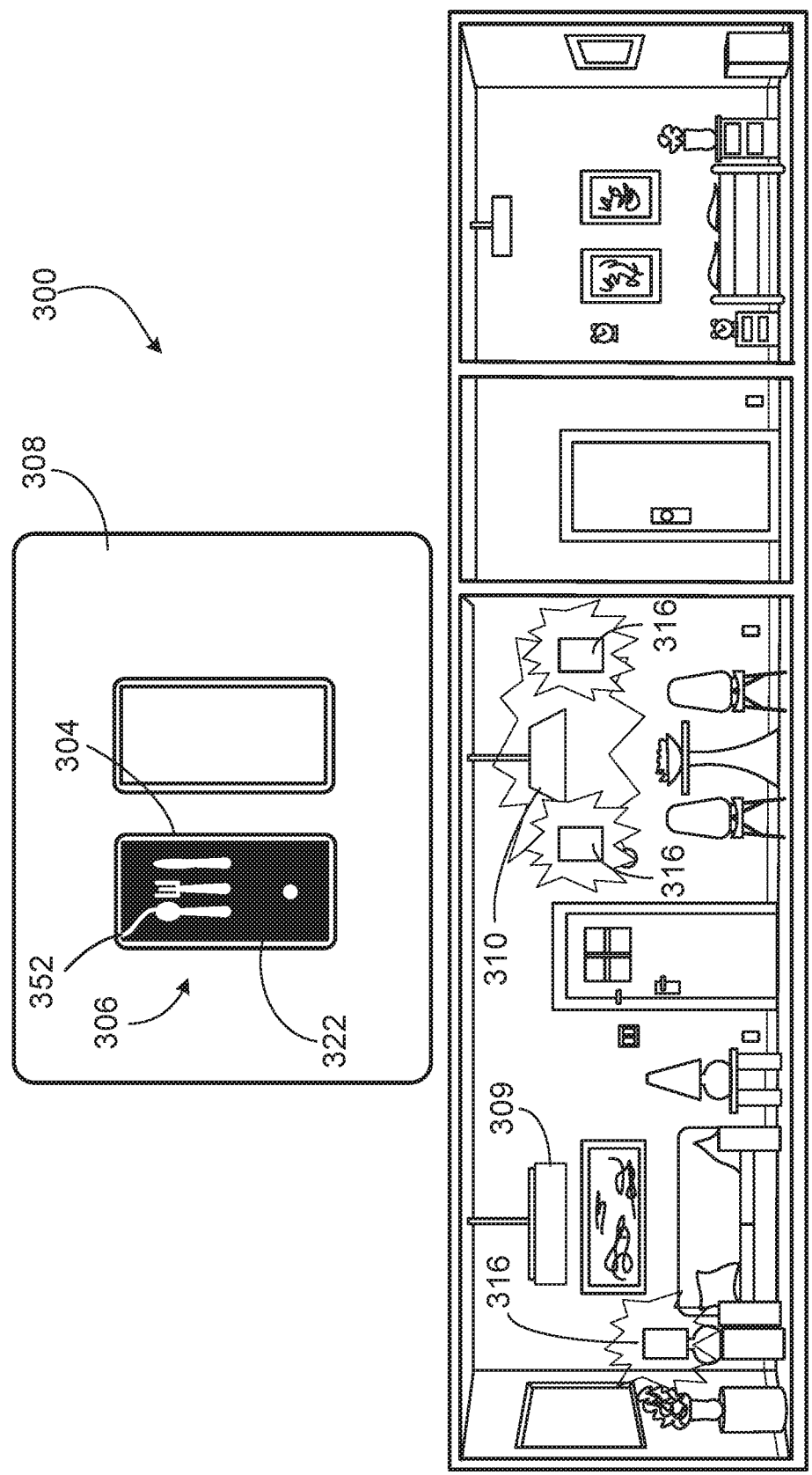
Figure 3F:
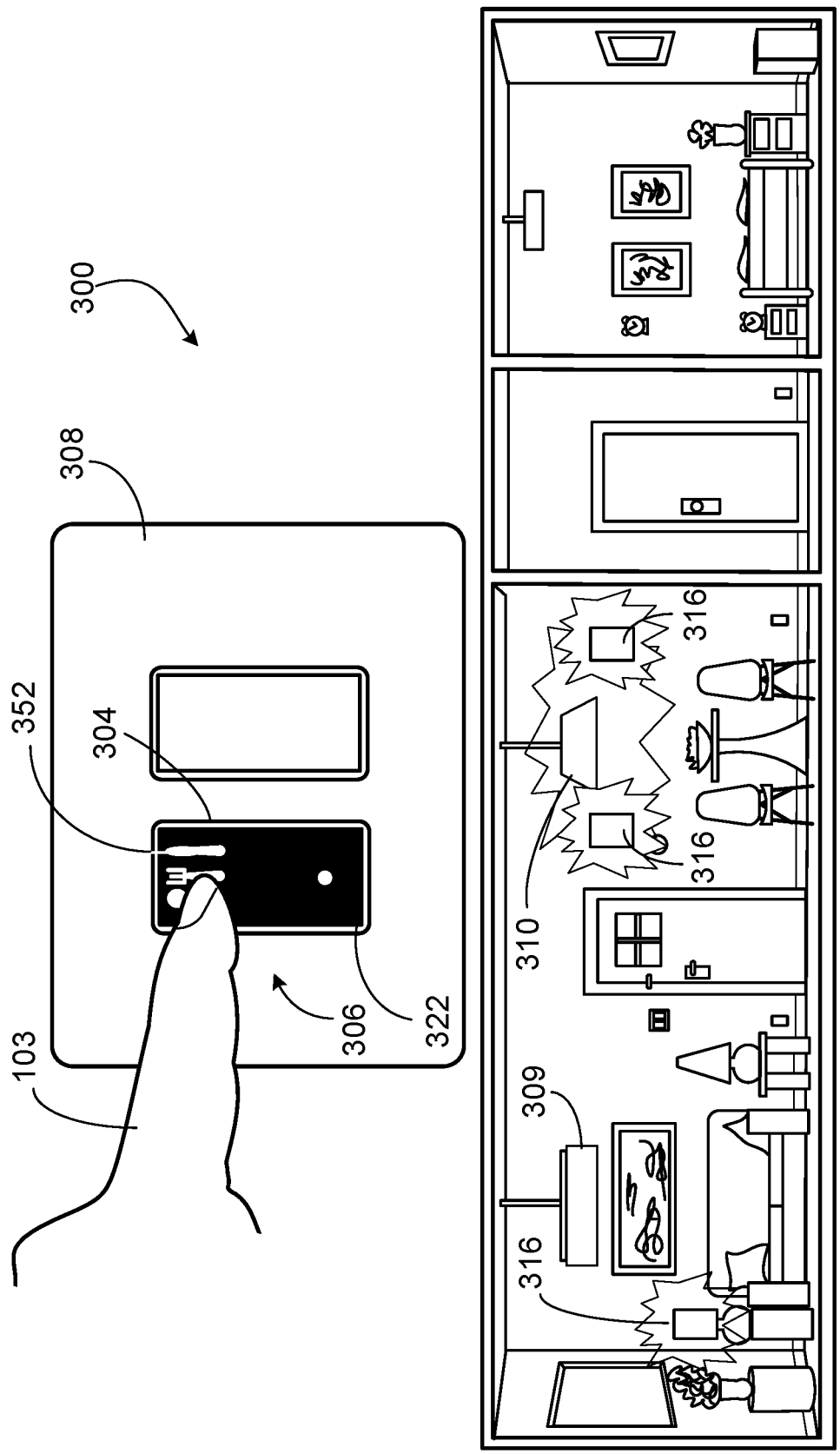

In FIG. 3A, the lighting control device 300 is connected to a base module positioned behind the wall plate 308. The lighting control device 300 includes a dynamic light switch actuator 306, operable in a manner similar to the light switch actuator discussed in connection with FIGS. 1A-2C, and an auxiliary light switch actuator. As demonstrated in FIG. 3A by the unilluminated outer actuation surface 322 of the light switch actuator 306 is inactive and not energized. In response to a user 103 moving the actuation surface 322 of the light switch actuator 306 (e.g., pivoting the actuation surface), the light switch actuator 306 begins to become energized, as shown in FIG. 3B. The energization or activation of the light switch actuator 306 is signaled by the power light indicator 305 and by full lighting setting icon 351. As shown in FIG. 3C where the icon 351 is fully lit (rather than partially lit as in FIG. 3B), the light switch actuator 306 is fully energized. In this particular configuration, the primary lights 309 and 310 are illuminated at full power. FIG. 3D shows the transition between lighting settings. As demonstrated in FIG. 3D, this transition is facilitated via a user 103 completing swiping gesture 312 across the tactile display 304 and along the actuation surface 322. As the user completes the gesture 312, the icon 351 is swiped from the tactile display 304 as the tactile display toggles, moves, switches to or selects a new light setting shown in FIG. 3E. The new light setting shown in FIG. 3E is represented or identified by the dinner icon 352. The new light setting shown in FIG. 3 has the light fixture 309 powered down and has caused lamp 316 and sconces 318 to become illuminated to change the lighting scene in the room. The change in the light setting causes a change in distribution of power to certain lighting fixture based on the selected lighting setting. The light switch actuator 306 may be pre-programmed with a plurality of lighting settings or may be configured with particular lighting settings as specified by the user 103. A further swiping gesture 315 shown in FIG. 3F or a different gesture are used to transition from the lighting setting of FIG. 3F represented by icon 352 to a further lighting setting. In particular embodiments, a lighting setting may include a fully off setting where the power is reduced so that the lighting fixtures aren't illuminated. In the fully off setting, the icon display can be off or indicative off an off state, while the power light indicator 305 remains illuminated to let the user know that the lighting control device 300 is in an activated or energized state. Accordingly, a user can turn off the light for a fixture that is connected to a smart bulb, but still retain the bulb in a state for activation remotely (e.g. for control via a mobile electronic device communicably coupled to the lighting control device 300) or locally, directly through the lighting control device 300.

Figure 4:
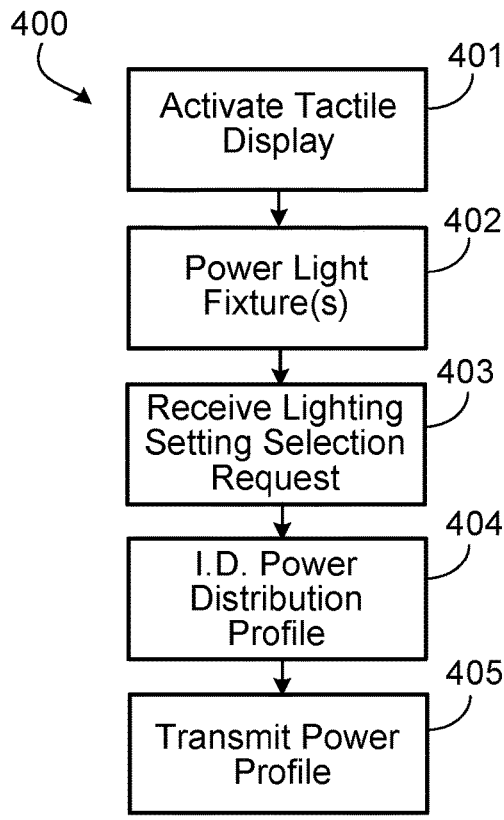
FIG. 4 provides a flow diagram of operations of a system for controlling a lighting control device.

FIG. 4 provides a flow diagram of operations of a system for controlling a lighting control device. FIG. 4 illustrates control operations of a control system, such as one or more processors 130 configured (e.g., programmed with computer program instructions, encoded on computer storage medium) to control the lighting control device 100 or 300, in accordance with various embodiments of the present invention. At 401, the tactile display housed in the light switch actuator is activated by moving the light switch actuator, for example by moving the actuation surface of the light switch actuator (e.g. pivotally moving the actuation surface). At 402, the light fixture(s) electrically coupled to the light switch actuator via a base module are powered as the movement of the light switch actuator causes an electrical contact component to move into a new position and thereby permit or cause an electrical flow path between a power source and the light fixture(s) to be closed. The tactile display housed in the light switch actuator is moved contemporaneously with the actuation surface. At 403, a lighting setting selection request is received via the tactile display, for example by a particular tactile motion or motions (e.g., swipes, gestures, taps, etc.) on the tactile display (i.e. touch screen display). The lighting setting selection request identifies a distinct lighting setting from among a plurality of lighting settings. A user may swipe multiple times to move, switch, or toggle through the plurality of lighting settings to select a particular lighting setting, or the user may conduct a specific motion that corresponds to a particular lighting setting including, but not limited to, a half swipe and tap to achieve a light intensity of all the connected light fixtures at half of their peak output. The lighting settings identify distinct power distribution schemes (e.g. distinct pre-set or programmed dimming profiles) for one or more light fixtures connected to the light switch module, which distribution scheme is automatically initiated based on user selection. At 404, a power distribution scheme is identified. At 405, the identified power distribution scheme is transmitted, for example by the base module responding to control signals from the light switch actuator, to adjust one, some, or all of the lights based on the power distribution scheme corresponding to the lighting setting selected. The power distribution schemes or profiles may be stored in a memory device of the lighting control device or on a remote computing device communicably coupled to the lighting control device. In certain embodiments, the power distribution schemes may be adjusted to account for other parameters such as ambient lighting from natural light or an unconnected source. In certain embodiments the power distribution schemes may be adjusted based on one or more other sensor parameters. In particular embodiments, the lighting setting may be adjusted by automation based on time of day, sensed parameters such as light, temperature, noise, or activation of other devices including, but not limited to, any electronic device described herein.

Figure 5:
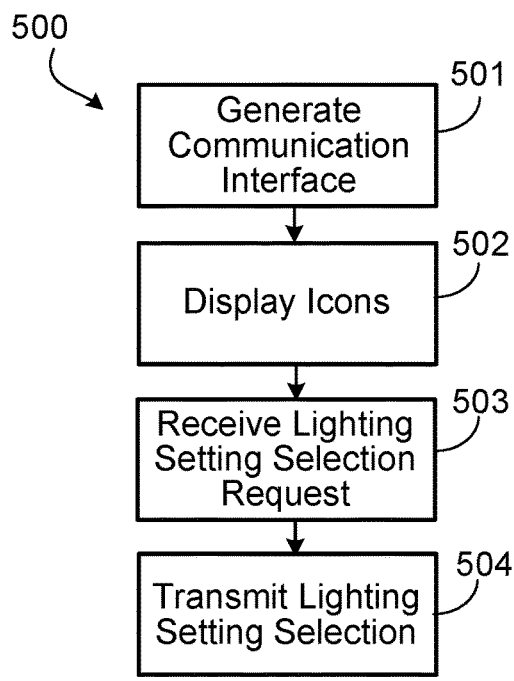
FIG. 5 shows a flow diagram of a system for remotely operating a lighting control device.

FIG. 5 shows a flow diagram of system for remotely operating a lighting control device. In particular embodiments, the lighting control device 100 or 300 may be operable from a remote device if the actuator switch is activated or energized. In such instances, the remote device may include one or more computer program applications, such as system 500, operating on the device to communicate with and control the lighting control device. Accordingly, at 501, the control system 500 initiates a connection module to generate a communication interface between a mobile electronic device and a light switch module. The connection module may cause the remote device to send one or more wireless transmission to the lighting control device via a communication protocol (e.g., Bluetooth). At 502, the control system 500 causes the remote device to generate a display of icons on a display device of the mobile electronic device to facilitate selection of a lighting setting. At 503, the control system 500 receives a lighting setting selection based on the user selecting a particular icon. At 504, a transmission module causes the lighting setting selected to be transmitted to the lighting control device so that the light switch module and/or the base module can cause the power distribution scheme corresponding to the lighting setting to be transmitted to the lighting fixtures. The tactile display of the lighting control device may be updated in concert with receipt of the lighting setting to display the icon selected on the mobile electronic device and corresponding to the lighting setting selected on the tactile device.

Figure 6:
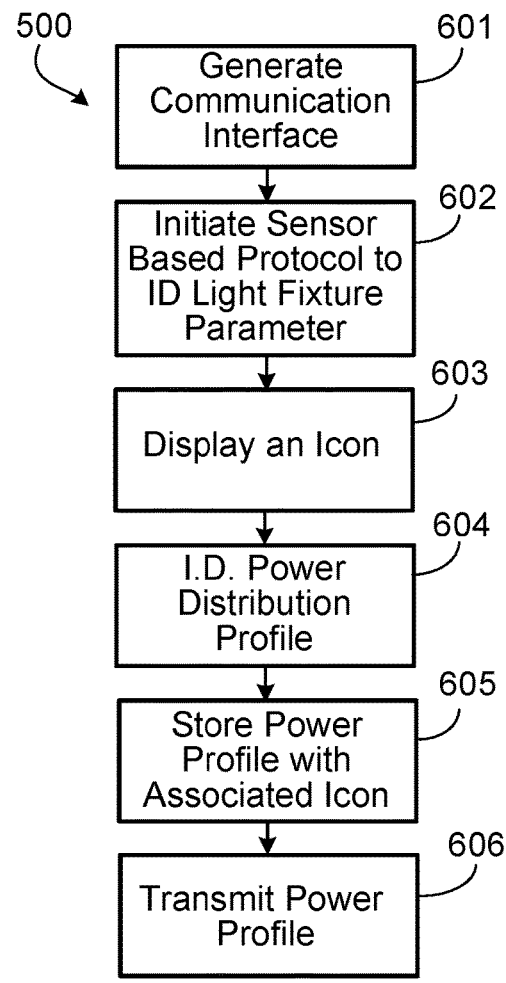
FIG. 6 illustrates a flow diagram of a system for remotely configuring operations of a lighting control device.

FIG. 6 illustrates a flow diagram of a system for remotely configuring operations of a lighting control device. The remote device may include devices including, but not limited to a mobile phone, a mobile computing device or a computing device remote from the light control device. At 601, the mobile electronic device generates a communication interface with the light switch module. At 602 a light fixture identification module initiates a sensor based protocol to identify a parameter associated with one or more light fixtures connected to the light switch control module. At 603, a display selection module causes a display of an icon to appear on a display device of the mobile electronic device. At 604, a lighting setting configuration module allows a user to create a power distribution scheme or profile for the light fixtures identified based on the identified parameters and a user specified input related to light intensity. At 604, a storage module is used to the store the power distribution scheme and associate a particular lighting setting icon with the power distribution scheme. At 605, a transmission module transmits the power distribution scheme and the associated icon to the light switch control module.

Implementations of the subject matter and the operations described in this specification can be implemented by digital electronic circuitry, or via computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Implementations of the subject matter described in this specification can be implemented in a computing system that includes a back end component, e.g., as a data server, or that includes a middleware component, e.g., an application server, or that includes a front end component, e.g., a user computer having a graphical display or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary implementations, and that such variations are intended to be encompassed by the present disclosure. It is recognized that features of the disclosed implementations can be incorporated into other disclosed implementations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:
1. A light switch module comprising:
   a light switch actuator comprising an electrical contact component, the light switch actuator configured to pivot with respect to a base housing portion so as to move the electrical contact component from a first position to a second position to connect an electrical flow path by pivoting of an actuation surface of the light switch actuator, the actuation surface comprising a foot portion extending outwardly from a plane of the actuation surface so as to facilitate pivoting of the light switch actuator; and
   a tactile display housed in the light switch actuator and configured for activation by the pivoting of the actuation surface moving the electrical contact component to the second position, the tactile display configured to pivot contemporaneously with the actuation surface, the tactile display configured to cause selection of a lighting setting selected from a plurality of lighting settings in response to one or more tactile motions on the actuation surface, the tactile display configured to discretely display a distinct icon in response to a change in the selection of the lighting setting.

2. The light switch module according to claim 1, further comprising a control system electrically coupled to the electrical contact component and the tactile display, the control system configured to:
- identify a power distribution scheme configured to allocate a discrete quantity of electrical power to each lighting fixture in a plurality of lighting fixtures in response to selection of the lighting setting via the tactile display; and
- cause distribution of the discrete quantity of electrical power to each lighting fixture in the plurality of lighting fixtures based on the identified power distribution scheme.

3. The light switch module according to claim 2, wherein the control system is further configured to change the power distribution scheme in response to the change in the lighting setting via the tactile display.

4. The light switch module according to claim 2, wherein the control system is configured for activation by movement of the actuation surface moving the electrical contact component to the second position.

5. The light switch module according to claim 1, wherein the light switch actuator is spring biased.

6. The light switch module according to claim 5, wherein the spring biased light switch actuator comprises a push button latch configured to click into place for removably coupling the light switch module to a base module.

7. The light switch module according to claim 1, wherein the light switch actuator is spring biased.

8. The light switch module according to claim 1, wherein the tactile display comprises a light emitting diode display.

9. The light switch module according to claim 1, wherein the one or more tactile motions includes a vertical swipe.

10. The light switch module according to claim 9, wherein the lighting setting is configured to have a gradient of light intensity in a vertical direction in the room in proportion to the vertical swipe.

11. The light switch module according to claim 1, wherein the one or tactile motions includes a combination of a swipe and a tap, the tap causing a selection of light intensity proportional to at least one of a length and a duration of the swipe.

12. The light switch module according to claim 1, further comprising a base module and a wall plate configured to be positioned between the light switch actuator and the base module.

13. The light switch module according to claim 12, wherein the light switch actuator includes a multi-pin connector configured to engage a multi-pin socket in the base module.

14. The light switch module according to claim 12, wherein the base module is sized and shaped to correspond substantially to an interior region of a one-gang wall electrical box.

15. The light switch module according to claim 14, wherein the base module includes two screw openings for mounting the base module in a wall electrical box.

16. A method of operating a light switch module comprising:
- activating a tactile display housed in a light switch actuator by pivoting an actuation surface of the light switch actuator via a foot portion of the actuation surface extending outwardly from a plane of the actuation surface, the pivoting of the actuation surface causing an electrical contact component of the light switch actuator to move from a first position to a second position to connect an electrical flow path, the tactile display configured to pivot contemporaneously with the actuation surface;
- in response to receiving a lighting setting selection request via the tactile display, identifying a lighting setting from among a plurality of lighting settings, each lighting setting corresponding to a distinct power distribution scheme for at least one light fixture connected to the light switch module based on the identified lighting setting, each distinct power distribution scheme configured to cause an allocation of a discrete quantity of electrical power to the at least one light fixture; and
- transmitting one or more power signals from the light switch actuator to the at least one light fixture based on the identified lighting setting.

17. The method according to claim 16, wherein the plurality of light settings having distinct power distribution scheme for light fixtures connected to the light switch module.

18. The method according to claim 16, wherein at least one lighting setting indicates an off state while the tactile display remains activated, whereby power transmitted to a light bulb in the light fixture is reduced so that the light bulb is unilluminated and remotely activatable via a mobile electronic device communicably coupled to the light switch module.

19. A method of operating a light switch module comprising:
- pivoting an actuation surface of a light switch actuator via a foot portion of the actuation surface extending outwardly from a plane of the actuation surface to connect an electrical flow path and to activate a tactile display housed in the light switch actuator and configured to pivot contemporaneously with the actuation surface; and
- selecting a lighting setting from among a plurality of lighting settings by applying one or more tactile motions on the actuation surface of the light switch actuator.

* * * * *